3,544,387
EXPENDABLE IMMERSION THERMOCOUPLE
Thomas E. Norby, Raleigh, N.C., assignor to Corning Glass Works, Corning, N.Y., a corporation of New York
Filed Dec. 28, 1966, Ser. No. 605,336
Int. Cl. H01v 1/04
U.S. Cl. 136—233   3 Claims

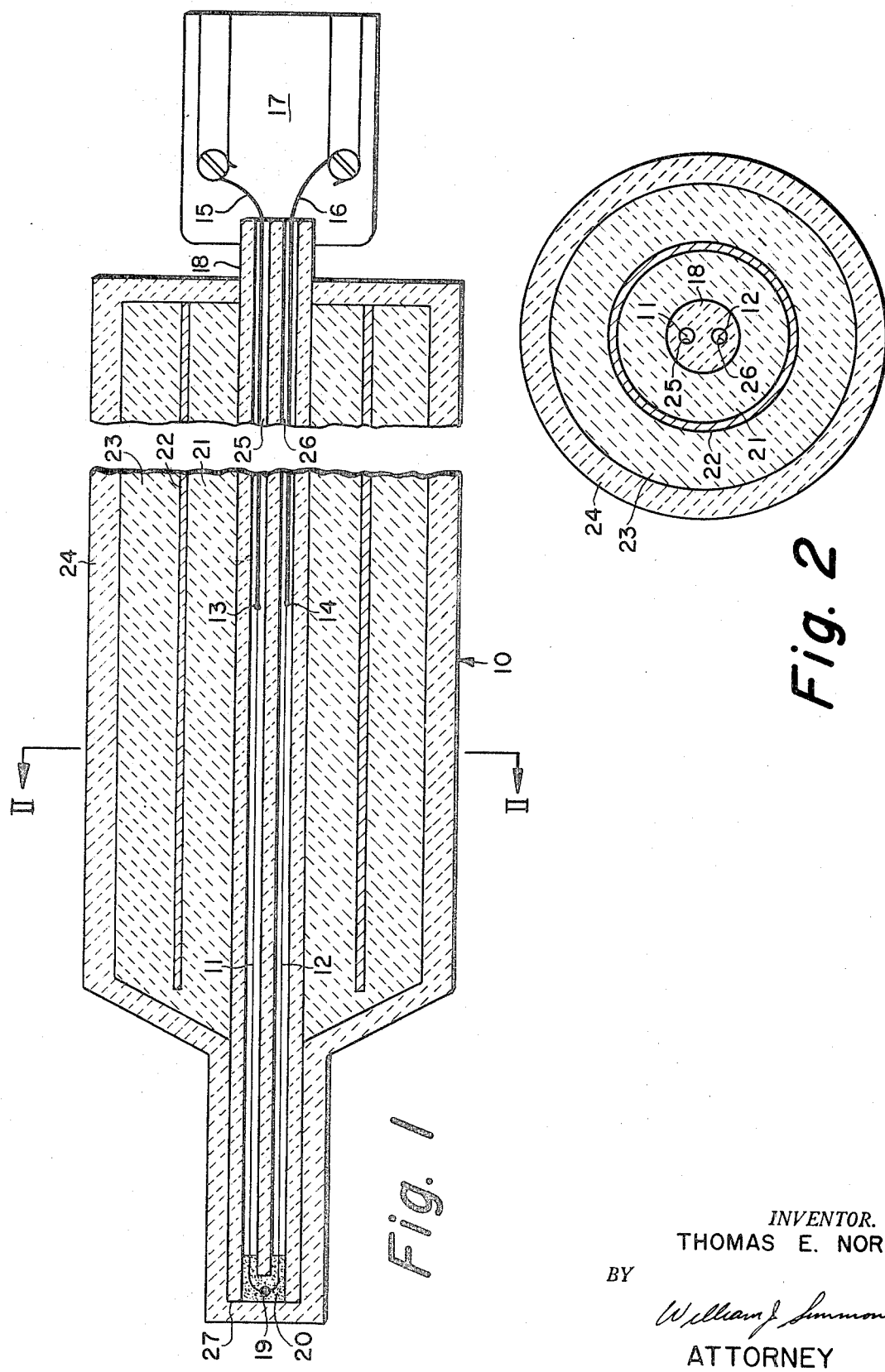

ABSTRACT OF THE DISCLOSURE

An inexpensive expendable thermocouple is disclosed which can be immersed in a molten pool of glass, metal or the like and remain at thermal equilibrium for a sufficient time to permit accurate recordation of temperature. The thermocouple includes a radiation shield around a vulnerable junction of lead wires and noble metal wires, but the shield does not extend to the area of the measuring junction.

---

In the measurement of the temperature of molten materials such as steel, the measuring junction of a thermocouple is immersed in the molten material and allowed to remain there until the temperature indicated by the recording device reaches an equilibrium. Repeated use of such thermocouples is undesirable since the calibration thereof is usually affected by the high temperatures and the nature of the molten material. The inconvenient and time consuming task of calibrating a thermocouple after each reading has caused the expendable thermocouple such as that described by H. G. Mead in U.S. Pat. No. 2,999,121 to become one of the most commonly used commercial methods of sensing temperature in molten materials.

Since expendable thermocouples are used only once and then discarded, they must be inexpensive to manufacture. The thermocouple portion is a short section of platinum-platinum rhodium wire connected to the reading instrument by less expensive compensated lead wires which may be made from copper and copper alloy wires. It is essential to keep the use of the noble metal to a minimum because of its high cost. The junction of the noble thermocouple wire and the lead wire therefore falls in a high temperature region. Since the lead wire is located in a high temperature zone, it is necessary to give it some form of protection in order to obtain a reliable reading before major error sets in and it finally melts. It is not only essential to prevent the lead wire from melting, but to hold its temperature below 300° F. to avoid decalibration. Some materials which have been used to protect the lead wire have included combinations of cardboard, plastic and plaster. The presently used devices last only a few seconds in a molten metal bath, giving an output indicator a very short time to respond. It is possible that these devices never reach thermal equilibrium or that the output indicator has not been stabilized before the thermocouple becomes decalibrated or disintegrates.

Much effort is being devoted to improving the expendable thermocouple. Temperature sensing devices have been produced which give accurate temperature readings for more than one hour in molten steel; however, costs are excessively high compared to the diposable thermocouple, making the use of such a device unfeasible.

It is therefore an object of this invention to provide an inexpensive, reliable, expendable thermocouple.

Another object of this invention is to provide an immersion thermocouple which provides a reading for a longer period of time before the unit is consumed or decalibrated.

Since radiation is a major source of heat transmission in the high temperature ranges such as those encountered in molten steel, the present invention employs a radiation shield to protect the compensated lead wire. Conventional thermocouples do little or nothing to prevent radiation from heating the junction of the noble and lead wires, thereby giving rise to a service life of about 5 to 10 seconds. The disclosed radiation shield protects the lead wire from excessive heating while permitting the full heating of the thermocouple measuring junction for a period of time during which equilibrium is reached, thereby permitting reliable readings for periods up to two minutes.

For further objects and advantages of the invention, reference may be had to the following description taken in conjunction with the following drawing in which:

FIG. 1 shows a longitudinal section of a thermocouple element constructed in accordance with this invention; and FIG. 2 shows a cross-sectional view taken along lines II—II of FIG. 1.

Because of the unit cost constraint, the quantity of platinum wire used in an expendable thermocouple must be very small. Therefore, a thermocouple assembly 10 which is shown in FIGS. 1 and 2 includes a pair of short thermocouple elements 11 and 12 which are both made of fine gauge wire. As is well known in the art, one of these wires may be platinum and the other may be an alloy of platinum including 10% rhodium. The thermocouple elements 11 and 12 are joined at junctions 13 and 14 to suitable compensated lead wires 15 and 16 respectively which are made of base metal. The lead wires are connected to a compensated connector 17 which may be used to connect the thermocouple to a measuring or recording instrument. The thermocouple elements and the compensated lead wires are located in the longitudinal passageways 25 and 26 of a double bore ceramic tube 18. The thermocouple elements 11 and 12 are electrically connected together to form the hot or measuring junction 19 in a recess in the end 27 of the double bore ceramic tube. The recess is filled with magnesium oxide slurry 20 to protect the measuring junction.

The double bore tube is covered with thermal insulation 21 which may consist of insulating materials such as asbestos, commercial ceramic cements, or oxide granules. This coating covers most of the tube 18 but does not extend to the end 27 which houses the thermocouple bead, the protective insulation tapering toward the end 27. A radiation shield 22, which may consist of a foil of a metal such as aluminum, copper or the like, having a high thermal reflectivity surrounds the thermal insulation layer. The radiation shield surrounds the ceramic double bore form a short distance above the thermocouple junction and continues along the thermocouple elements beyond the junctions 13 and 14 to a point where heating of the extension wires 15 and 16 would not be excessive. The radiation shield may be surrounded by another layer of thermal insulation 23, and the entire thermocouple assembly is covered with a ceramic or other protective material 24 which may consist of a coating of cement and inorganic oxide granules. The outer coatings must be adequate to protect the foil from disintegration as long as it is useful in keeping radiation energy at a level which is low compared to the conducted heat.

The magnesium oxide slurry 20 and the thin ceramic coating 24 which protect the thermocouple junction permit quick thermal response and yet are adequate protection from the high temperature environment. The ceramic which covers the measuring junction may be unsintered or sintered mullite, alumina, magnesia, or any relatively high temperature material which does not react too quickly with the thermocouple measuring junction to cause decalibration.

What is claimed is:

1. An expendable thermocouple comprising: an elongated insulative hollow body having first and second ends, a pair of mutually insulated thermocouple elements extending throughout a portion of the length of said body and being joined at the first end of said body to form a measuring junction, a pair of compensated lead wires respectively joined at a pair of second junctions to the ends of said thermocouple elements which are remote from said measuring junction, said lead wires extending from the second end of said body, a metallic foil radiation shield having a high thermal reflectivity disposed about that portion of said hollow body surrounding said pair of second junctions and extending beyond said pair of second junctions to a point where radiative heating of said lead wires is not excessive, said radiation shield terminating short of said first end of said body, thereby leaving a portion of said body exposed to radiative heating so that said measuring junction is not shielded thereby and a thermal insulation layer surrounding said foil throughout substantially its entire length.

2. An expendable thermocouple as set forth in claim 1 which further includes a high temperature resistant material surrounding said measuring junction.

3. An expendable thermocouple as set forth in claim 2 which further includes a ceramic coating which encloses the exposed portion of said body, said layer of thermal insulation material, and said high temperature resistant material.

References Cited

UNITED STATES PATENTS

| | | | |
|---|---|---|---|
| 2,084,654 | 6/1937 | Ray | 136—228 |
| 2,584,615 | 2/1962 | Richards | 136—234 |
| 2,584,616 | 2/1962 | Richards | 136—234 |
| 2,948,766 | 8/1960 | Schneider et al. | 136—232 |
| 3,011,006 | 11/1961 | Nicholson et al. | 136—234 |
| 3,159,032 | 12/1964 | Rademacher et al. | 136—231 |
| 3,038,951 | 6/1962 | Mead | 136—234 |

ALLEN B. CURTIS, Primary Examiner

M. J. ANDREWS, Assistant Examiner